F. STAFFORD.
Car-Starter.
No. 163,895.
Patented June 1, 1875.
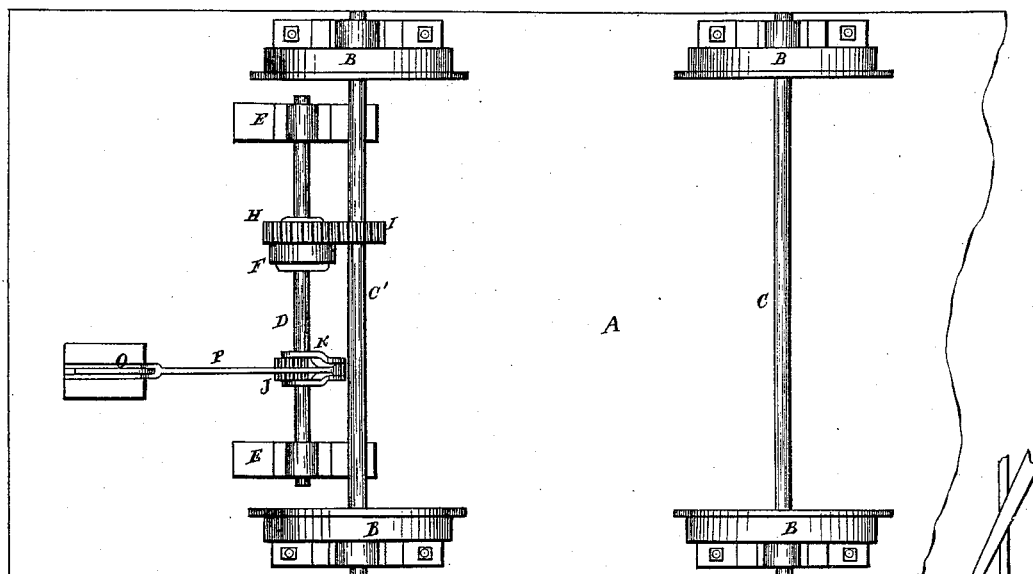
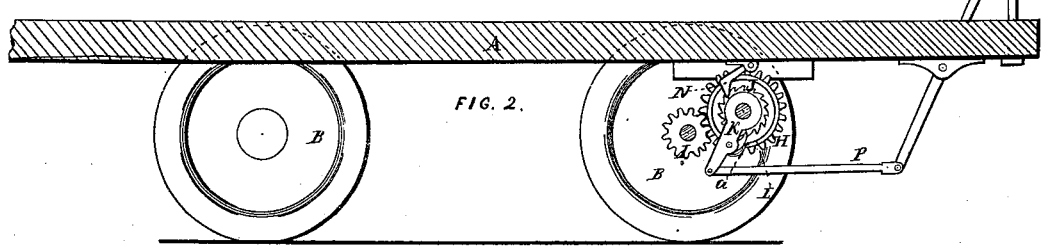
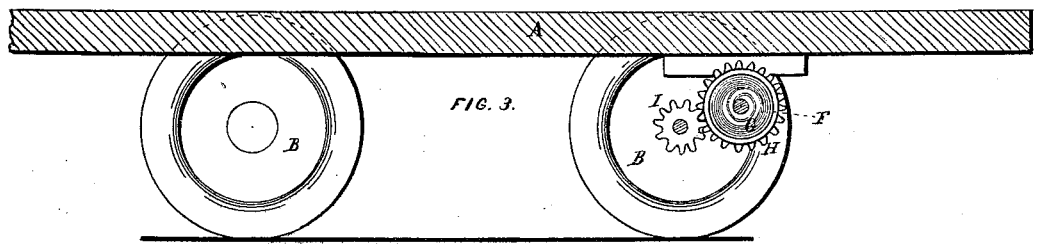
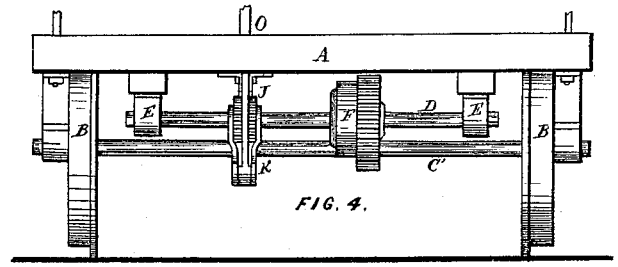
WITNESSES.
A. F. Cornell.
Wm. K. Kidd
INVENTOR.
Frank Stafford.
Per. Burridge & Co.
Attys.

UNITED STATES PATENT OFFICE.

FRANK STAFFORD, OF CLEVELAND, OHIO.

IMPROVEMENT IN CAR-STARTERS.

Specification forming part of Letters Patent No. 163,895, dated June 1, 1875; application filed March 4, 1875.

*To all whom it may concern:*

Be it known that I, FRANK STAFFORD, of Cleveland, in the county of Cuyahoga and State of Ohio, have invented new and useful Improvements in Motors for Street-Railway Cars, of which the following is a full and complete description, reference being had to the accompanying drawings, in which—

Figure 1 is an under-side view of a car having attached thereto the motor. Figs. 2 and 3 are vertical sections. Fig. 4 is an end view of Fig. 1.

Like letters of reference refer to like parts in the several views.

The nature of this invention relates to a street-railway car; and the object thereof is to propel said car by means of a coiled spring arranged in a box or case. Said case is secured to a shaft put in communication with the axle of the car-wheels, by certain gearing for driving the wheels, the shaft and gearing being actuated by the recoil of the spring, which is wound up by a ratchet wheel and pawl, as hereinafter more fully described.

In the drawing, A represents the bottom of a street-railway car, of which B are the wheels, and C the axles, all of which is, or may be, constructed in the ordinary way. Directly in front of the axles C' is journaled a shaft, D, Fig. 1, in the hangers E. On said shaft is secured a box or case, F, wherein and around the shaft is coiled a spring, G, Fig. 3. One end of the spring is attached to the shaft, whereas, the opposite end is attached to the box. In connection with the box is a gear, H, made to engage a gear, I, on the shaft C', as shown in the drawing. On the shaft D is also a ratchet-wheel, J, arranged within the bifurcated arm K. In the arm is also secured a pawl L, and spring $a$, for operating the ratchet. N is a click or check, attached to the bottom of the car, and made to engage the ratchet-wheel. The arm K is operated by the lever O, pivoted in the platform of the car, and which is connected to the arm by a link, P, as shown in Fig. 2.

The practical operation of the motor is as follows: The operator, standing on the platform of the car, operates the pawl and ratchet-wheel, above described, by means of the lever O, thereby winding up the spring G, referred to, the resiliency of which revolves the gear H, which, by its engagement with the wheel I, in turn revolves the wheels B, thereby carrying forward the car, the speed thereof being in proportion to the tension of the spring, which may be more or less, as it may be wound up, and as the weight to be moved may require.

I am aware that springs, levers, ratchets, and gear-wheels, have heretofore been used for aiding in the starting of street-cars, as shown in the patent granted to George S. Petry, April 9, 1867; I do not, therefore, claim, broadly, these devices, but only in the combination herein shown and described.

What I claim as my invention, and desire to secure by Letters Patent, is—

The shaft D, having upon it a case, F, and a propelling spring, G, gear-wheel H, for imparting motion to the car, and a ratchet for winding up the spring, in combination with the gear-wheel I, bifurcated arm K, connecting-rod P, and lever O, substantially as and for the purpose set forth.

FRANK STAFFORD.

Witnesses:
W. H. BURRIDGE,
A. F. CORNELL.